L. COOPER.
FUEL INDICATOR.
APPLICATION FILED APR. 16, 1920.
1,380,359.
Patented June 7, 1921.
2 SHEETS—SHEET 1.
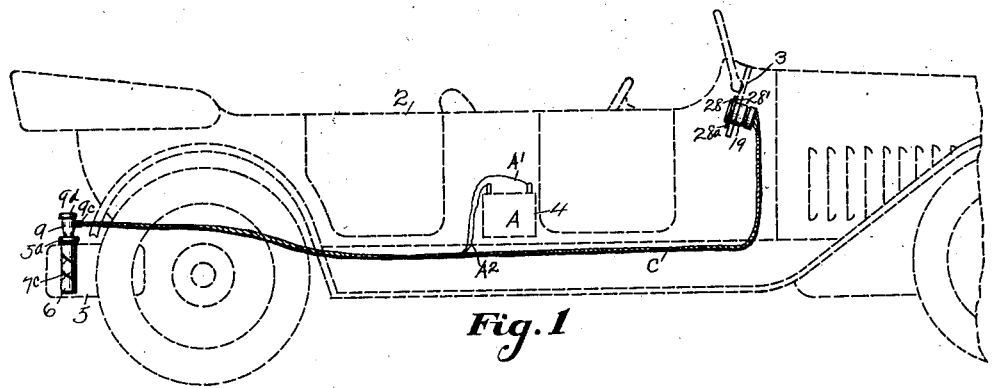
Fig. 1
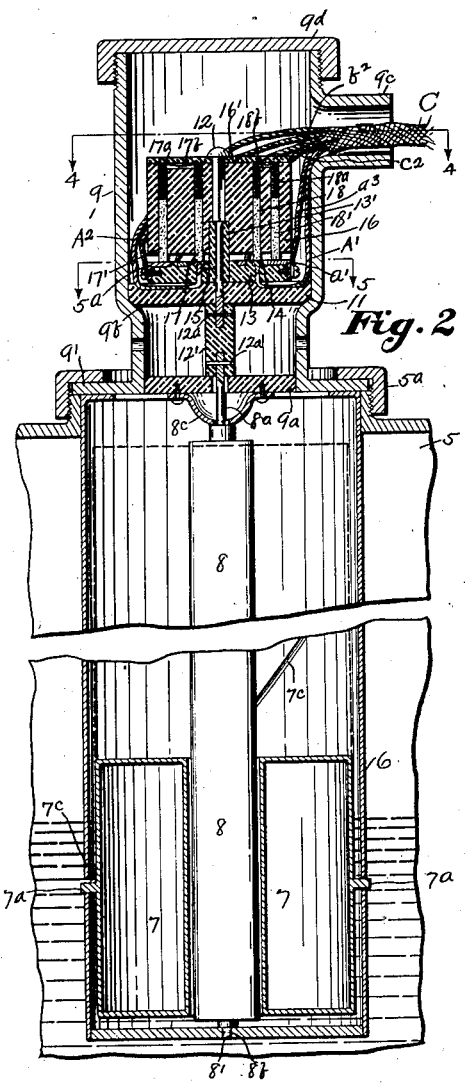
Fig. 2
Fig. 3
Fig. 4
INVENTOR.
Leonard Cooper
BY Harry D. Wallace
ATTORNEY.

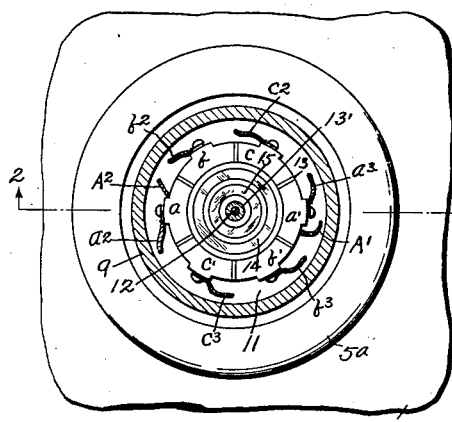

UNITED STATES PATENT OFFICE.

LEONARD COOPER, OF SYRACUSE, NEW YORK, ASSIGNOR OF ONE-FOURTH TO THEODORE O. HICKOK AND ONE-FOURTH TO FRANK T. MILLER, BOTH OF SYRACUSE, NEW YORK.

FUEL-INDICATOR.

1,380,359.  Specification of Letters Patent.  Patented June 7, 1921.

Application filed April 16, 1920. Serial No. 374,446.

*To all whom it may concern:*

Be it known that I, LEONARD COOPER, a citizen of the United States, residing at Syracuse, in the county of Onondaga and State of New York, have invented certain new and useful Improvements in Fuel-Indicators, of which the following is a specification.

This invention relates to fuel indicators for automobiles, and has for its object to provide novel and simple mechanism for measuring and constantly indicating the depth or amount of gasolene in the fuel tank. A further object is to provide a float controlled electric distributer or switch, which is mounted on the fuel tank, and which electrically controls and operates an indicator, which is conveniently mounted on the dash, or like support, in plain view of the driver of the automobile. And a further object is to generally improve and simplify the construction, arrangement and operation of fuel indicators of the class.

I attain these objects by the means set forth in the detailed description which follows, and as illustrated by the accompanying drawing, in which—

Figure 1 is a skeleton view of an automobile to which my improvement is applied. Fig. 2 is a central vertical section through the float chamber and related parts, taken on line 2—2 of Fig. 5. Fig. 3 is a central vertical section, taken on line 3—3 of Fig. 6. Fig. 4 is a horizontal section, taken on line 4—4 of Fig. 2. Fig. 5 is a similar section, taken on line 5—5 of Fig. 2. Fig. 6 is a face view of the indicator proper. Fig. 7 is a diagrammatic view of the electric circuits. And Fig. 8 is a reduced end view of the float.

In the drawings, 2 represents generally an automobile; 3 is the dash; 4 is the usual storage battery, and 5 is the fuel tank, which is usually disposed at the rear of the car.

6 designates a hollow cylindrical float chamber, having an open top, which is disposed upright in the tank 5, the latter being perforated for the purpose at its top and provided with a threaded flange. Within the cylinder 6 is disposed a cylindrical float 7, which has a slot-like opening extending through its longitudinal center, to loosely receive a flat guide bar 8, upon which the float slides as it ascends and descends in the chamber 6. The opposite ends of the guide 8 are provided with gudgeons 8' and 8ª, by which the guide is pivoted in the line of the axis of the chamber 6. The gudgeon 8' pivots in a socket 8ᵇ in the bottom of the cylinder 6, while the gudgeon 8ª is journaled in a bearing 8ᶜ, which is supported by a disk 9ª. The gudgeon 8ª preferably passes loosely through and extends above the said disk. The float 7 is provided at its opposite sides with trunnions 7ª, which are received by and play in spiral slots 7ᶜ, which are cut in the opposite sides of the cylinder 6, one of which is shown in Fig. 2. By this contruction and arrangement of the parts, when the float is raised and lowered by the filling and emptying of the tank 5, the float is given a partial rotary or twisting motion, in opposite directions, which rotates the flat guide 8 correspondingly. 9 designates a hollow cylindrical casing which is mounted upright on the threaded flange, its top and bottom being open, and the bottom being provided with an annular flange 9', which is gripped by a gland-nut 5ª, for rigidly holding the said casing in place and in line with the chamber 6. The bottom end of casing 9 is substantially closed by the disk 9ª. Above the nut 5ª the casing 9 is expanded for providing an annular ledge 9ᵇ, which supports a stationary disk 11, the latter preferably being fiber and tightly fitted into the casing 9. The disk 11 supports the stationary and movable parts of the electric switch or current distributer, which controls the indicator proper. The disk 11 is perforated centrally to receive a shaft 12, which extends above and below said disk, the lower end of said shaft being operatively connected to the gudgeon 8ª, by a fiber or other coupling 12', which insulates said parts, the said coupling being secured to said shaft and gudgeon by pins 12ª. 13 is a smaller disk of fiber, which is rigidly mounted on the disk 11, and is perforated centrally to receive a fiber sleeve 13', which insulates the intermediate portion of the shaft 12. Upon the disk 13 are mounted concentric rings 14 and 15, which form parts of an electric circuit comprising a battery A, a wire A', which connects the positive pole of the battery to the ring 14, and a wire A², which connectes the negative pole of the battery to the ring 15. Around the outer edge of the disk 13, are disposed a number of similar metal segments, the same being arranged in pairs, as *a—a' b—b'*, and $c$—$c'$, which are suitably insulated from each other, and to each segment is connected a wire, as $a^2$, $a^3$, $b^2$, $b^3$, $c^2$ and $c^3$, the said wires extending forwardly from the tank 5 (preferably as a cable C) toward the dash 3. The movable parts of the distributer or switch consist of a fiber or other block 16, which is rigidly mounted on the shaft 12, and is supported chiefly by the sleeve 13' a suitable distance from the disk 13, the upper end portion of the shaft 12 preferably being square, so as to effect the rotation of said block. The block 16 is bored out to receive a number of carbon or other brushes 17—17' and 18—18', which are resiliently held in contact with the rings 14 and 15 and the segments $a$—$b$—$c$, by springs $17^a$ and $18^a$, the said springs being tied together at $17^b$ and $18^b$ and serving as conductors for electrically connecting the corresponding brushes. These springs are held in place by a plate 16'. The cable C for a part of its length includes battery wires A' and $A^2$, the said cable passing out of the casing 9 by means of a drawn neck $9^c$. The top of the casing 9 is closed by a screw cap $9^d$.

The indicator, which is shown conveniently mounted on the dash 3, comprises the following parts: 19 is a hollow tubular casing, open at its opposite ends, and having its intermediate portion spun or otherwise operated upon for providing an internal rib 19', which supports an annular coil 20, consisting of an iron core 20', and a continuous winding of wire $20^a$. Above the coil 20 is inserted a disk-like dial 21, which preferably fits snugly into the upper end of the casing 19, and has a number of depending lugs 21', which bear upon and hold the coil 20 in place. The lugs of the dial and the casing are correspondingly perforated to receive rivets or screws $21^a$. The dial 21 is provided with a broken circle $21^b$, which is subdivided into equal sections (black and white alternating) for indicating gallons of the fuel, and also letters or symbols for indicating that the tank 5 is empty or full. Above the dial is disposed a rotatable pointer 22, which is supported by a spindle or shaft 23, the latter having its lower end pivoted in a threaded plug 23', which is adjustably supported by a fiber disk 24, the said disk being suitably secured in the bottom of the casing 19. The upper end of the shaft 23 is pivoted in a bridge 25, which extends diametrically across and is supported by the dial 21. The shaft 23 supports and is rotated by a needle like permanent magnet 26, which is disposed centrally in the coil 20. The dial 21 is protected by a glass disk 27, which rests upon the top end of the casing 19, and is held in place by a flange-ring 28, which is threaded to the upper end of the casing 19, and its perforated flange 28' rests upon the dash 3 or other suitable support, where it is held in place by screws $28^a$. The wires $a^2$—$a^3$, $b^2$—$b^3$ and $c^2$—$c^3$ extend from the corresponding segments of the distributer to binding-posts $24^a$, $24^b$, $24^c$ etc., carried by the closure 24, and thence lead to and tap the coil 20 at equidistant points in the circle of said coil, as shown in Figs. 3 and 7. In Fig. 7 the wires of each pair, as $a^2$—$a^3$, etc., connect with the coil 20 at diametrically opposite points, so that when the battery current is carried over the several lines to said coil, the magnet 26 is attracted and rotated like an armature, in a well-known manner, in the proper direction for indicating the filling or emptying of the tank 5. Thus while the tank is being filled with gasolene, the float 7 rises in the chamber 6, and in doing so it rotates the guide 8 and the block 16. This moves the brushes 17 and 18 clockwise over the segments $a$—$b$—$c$ and rings 14—15, and distributes the battery current correspondingly to different portions of the coil 20, thereby effecting the clockwise rotation of the armature 26 and the pointer 22, until the latter points to the last dial sector opposite the word "Full." Thereafter, as the gasolene is consumed by the motor, the float 7 gradually descends in the chamber 6 and rotates the guide 8 and the block 16 in the opposite direction, which reverses the movements of the rotor 26 and the pointer 22, for indicating less and less fuel in the tank 5.

My fuel indicating mechanism is simple, and it is positive and automatic in its operation. It requires no attention or care after it is once properly installed. The fuel tank may be located at any suitable distance from the indicator proper, and the latter may be located in any suitable position, while the electric current employed for operating the signal may be derived from a battery, or direct from a generator, without requiring any alteration or change in the mechanism.

Having thus described my invention, what I claim, is—

An indicator of the class described, including a hollow casing provided with an inturned annular rib, an annular coil supported by said rib, a dial mounted concentrically with and above said coil, said dial having a number of depending lugs which bear upon and hold the coil in place, a pointer pivotally mounted for sweeping said dial, a spindle supporting said pointer disposed concentrically with and in said coil and said dial, and an armature carried by said spindle and operated step-by-step by electric currents passing through different segments of said coil.

In testimony whereof I affix my signature.

LEONARD COOPER.